(12) United States Patent
Chang

(10) Patent No.: US 9,298,070 B2
(45) Date of Patent: Mar. 29, 2016

(54) PARTICIPANT COLLABORATION ON A DISPLAYED VERSION OF AN OBJECT

(75) Inventor: Nelson Liang An Chang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 539 days.

(21) Appl. No.: 13/643,884

(22) PCT Filed: Apr. 29, 2010

(86) PCT No.: PCT/US2010/033068
§ 371 (c)(1),
(2), (4) Date: Oct. 26, 2012

(87) PCT Pub. No.: WO2011/136784
PCT Pub. Date: Nov. 3, 2011

(65) Prior Publication Data
US 2013/0038729 A1  Feb. 14, 2013

(51) Int. Cl.
| | |
|---|---|
| H04N 7/18 | (2006.01) |
| G09G 5/00 | (2006.01) |
| G03B 21/00 | (2006.01) |
| G06T 15/10 | (2011.01) |
| G02B 3/00 | (2006.01) |
| G03B 21/26 | (2006.01) |
| H04N 9/31 | (2006.01) |
| H04N 13/04 | (2006.01) |

(52) U.S. Cl.
CPC .............. *G03B 21/00* (2013.01); *G03B 21/26* (2013.01); *H04N 9/31* (2013.01); *H04N 13/0459* (2013.01); *A63F 2300/1087* (2013.01); *A63F 2300/6676* (2013.01); *A63F 2300/69* (2013.01)

(58) Field of Classification Search
CPC .......... G03B 21/00; G09G 5/00; G06T 15/10
USPC ............. 348/143; 353/8; 345/156, 1.2, 9, 427
See application file for complete search history.

(56) References Cited

U.S. PATENT DOCUMENTS

| | | | |
|---|---|---|---|
| 5,847,748 A | 12/1998 | Laughlin | |
| 6,292,305 B1 * | 9/2001 | Sakuma et al. | ............... 359/649 |
| 6,388,654 B1 | 5/2002 | Platzker et al. | |
| 2002/0067466 A1 * | 6/2002 | Covannon et al. | ................ 353/8 |
| 2002/0126396 A1 * | 9/2002 | Dolgoff | ......................... 359/743 |
| 2007/0291035 A1 * | 12/2007 | Vesely et al. | .................. 345/427 |

FOREIGN PATENT DOCUMENTS

| | | |
|---|---|---|
| JP | 05329793 | 12/1993 |
| TW | M304666 | 1/2007 |
| WO | WO-9214338 | 8/1992 |

OTHER PUBLICATIONS

International Search Report and Written Opinion of the International Searching Authority, mailed Jan. 28, 2011, issued in related PCT Application No. PCT/US2010/033068.

* cited by examiner

*Primary Examiner* — Sath V Perungavoor
*Assistant Examiner* — Patricia I Young
(74) *Attorney, Agent, or Firm* — HP Inc Legal Department

(57) ABSTRACT

A projector is associated with a head gear for a first participant of collaboration. The head gear does not obstruct the participant's eyes. The projector is configured to receive an image which was created with respect to a first participant's view point based on a dataset that represents an object. The projector is configured for projecting the received image onto a display surface. The first participant perceives the projected image by receiving at least a portion of diffused light associated with the projected image at the first participant's eye that is closest to the projector.

18 Claims, 4 Drawing Sheets

PARTICIPANT COLLABORATION ON A DISPLAYED VERSION OF AN OBJECT

FIELD

This disclosure relates to systems and methods that enable participants to collaborate on a displayed version of an object.

BACKGROUND

Collaboration systems enable a team of people (also referred to as "participants") to achieve a common goal, such as developing an idea, creating a design, solving a problem, or playing a game. Typically collaboration systems enable the team of people to work toward the common goal by coordinating the exchange of information and ideas. Collaboration facilitates the group decision making process with a rapid exchange of ideas. The rapid exchange of ideas is also referred to as "brain storming."

BRIEF DESCRIPTION OF THE DRAWINGS

The accompanying drawings, which are incorporated in and form a part of this Detailed Description, illustrate various examples and, together with the description, serve to explain principles discussed below.

Figure 1A:
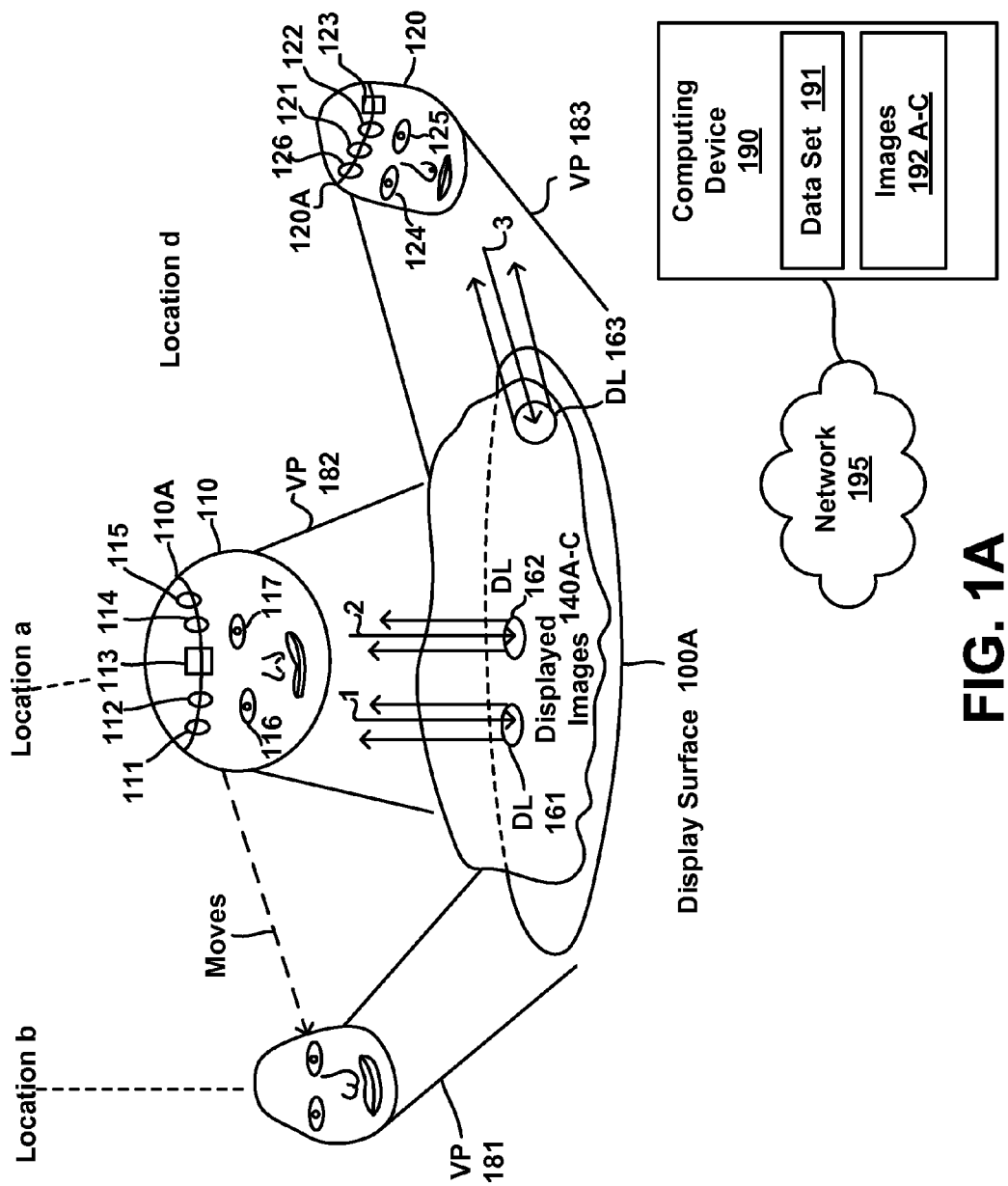
FIG. 1A depicts an example system for participant collaboration on a displayed version of an object example using a horizontal display surface.

The drawings referred to in this Brief Description should not be understood as being drawn to scale unless specifically noted.

DETAILED DESCRIPTION

Reference will now be made in detail to various examples of the subject matter, examples of which are illustrated in the accompanying drawings. While various examples are discussed herein, it will be understood that they are not intended to limit to these examples. On the contrary, the presented examples are intended to cover alternatives, modifications and equivalents, which may be included within the spirit and scope the various examples as defined by the appended claims. Furthermore, in the following Detailed Description, numerous specific details are set forth in order to provide a thorough understanding of examples of the present subject matter. However, examples may be practiced without these specific details. In other instances, known methods, procedures, components, and circuits have not been described in detail as not to unnecessarily obscure aspects of the described examples.

Unless specifically stated otherwise as apparent from the following discussions, it is appreciated that throughout the present Detailed Descriptions, discussions utilizing terms such as "comprising," "projecting," rendering," "enabling," "diffusing," "configuring," "updating," reflecting," "performing," "determining," "calculating," "receiving," "using," "transforming," "using data to transform the state of a device," or the like, refer to the actions and processes of a computer system, or electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Some examples of the subject matter are also well suited to the use of other computer systems such as, for example, optical and virtual computers.

Various examples provide for participant collaboration on a displayed version of an object, such as a molecule. For example, an image of the molecule can be created with respect to the location of a participant relative to a display surface based on a dataset that represents the molecule. The created image can be received by a projector associated with the participant's head gear. The image can be displayed when the projector projects the received image onto the display surface. According to one example, the display surface reflects and diffuses light from the projected image that hits the display surface resulting in the participants' eyes seeing a portion of light associated with the displayed image.

According to one example, the head gear includes one projector that receives and projects an image onto the display surface. In this case, both of the participant's eyes see a portion of light associated with the displayed image. In another example, the head gear includes two projectors that receive and project slightly different images onto the display surface where one of the images is intended for the participant's right eye and the other image is intended for the participant's left eye.

Further, since the images are created with respect to locations associated with the participants relative to the display surface, each of the participants have their own unique view points of the displayed version of the object, according to various example. The images can be updated to reflect changes, such as movement of the molecule or parts of the molecule over time, the participants' locations relative to the display surface, annotations that the participants associate with the molecule, or the participants engaging in behaviors that cause the displayed molecule to move, among other things.

FIG. 1A depicts an example system for participant collaboration on a displayed version of an object example using an example of a horizontal display surface 100A. The features depicted in FIG. 1A can be arranged differently than as illustrated, and can implement additional or fewer features than what are described herein. Further, the features in FIG. 1A can be combined in various ways. The system, depicted in FIG. 1A, can be implemented with hardware, hardware and machine readable instructions, (such as but not limited to hardware and software or hardware and firmware), or a combination thereof.

FIG. 1A depicts two participants 110, 120 wearing head gears 110A, 120A and standing around a horizontal display surface 100A (also referred to as a "table top display surface"). The system includes the head gears 110A, 120A and the display surface 100A. The system may also include one or more computing devices 113, 123, 190. The computing devices 113, 123, 190 may communicate with each other over a network 195 that may be wireless or wired. According to one example, a computing device 190 includes a dataset 191 that represents an object. Images 192A-192C can be created based on the dataset 191.

Although, dataset 191 is depicted as residing at computing device 190, the dataset 191 may be stored in part or in whole on any one or more of the computing devices 113, 123, 190 or electronic memory that is accessible by any one or more of the computing devices 113, 123, 190, among other things.

A participant 110, 120's head gear 110A, 120A can be any device for attaching projectors 112, 114, 122, 126 to the participant 110, 120's head. For example, the head gear 110A, 120A may use a band around the participant's forehead, a band that goes over the top of the participant's head, a hat, or some means for positioning a projector near an eye, such as above the eye or to the side of the eye. The head gear may use a sticky substance or suction cups to attach a projector to a participant's head instead of a band or hat, among other things. The head gear may also optionally include one or more cameras or one or more computing devices.

Referring to FIG. 1A, one of the participant 110's head gear 110A includes two projectors 112, 114, two optional cameras 111, 115, and one optional computing device 113. The other participant 110's head gear 110A includes one projector 122, one optional camera 121 and one optional computing device 123. Examples of projectors 112, 114, 122 include pico or micro projectors, such as those found in cell phones. The projectors 112, 114, 122 can be low lumen projectors. The projectors 112, 114, 122 can be laser projectors. Typically an image projected by a laser projector is focused no matter how they are positioned relative to a display surface, such as display surface 100A. According to one example, a projector 112, 114, 122 is mounted in close proximity to a participant's eye. A projector 112, 114, 122 projects an image of an object (also referred to herein as "a projected image") that was created based on the dataset 191 that represents the object.

According to one example, a projector 112, 114, 122 projects an image 140A-140C onto the display surface 100A for a particular participant 110's, 120's view point 181-183. For example, the location of a participant 110, 120 with respect to the display surface 100A can be determined and the computing device 190 can create an image 192A-192C of an object based on the data set 191 and the location of the participant 110, 130. With respect to a head gear 110A with two projectors 122, 114, image 192A and image 192B can be created respectively based on the dataset 191 and with respect to the locations of the participant 110's right and left eyes. The projector 114 near participant 110's left eye can receive image 192B and the projector 112 near participant 110's right eye can receive image 192A. The respective projectors 112, 114 project the received images 192A and 192B onto the display surface 100A resulting in the displayed images 140A, 140B. As depicted in FIG. 1A, light 1 is associated with the projected image 192A and light 2 is associated with the projected image 192B. According to one example, the display surface 100A, reflects and diffuses the light 1 and 2 so that eye 116 receives at least a portion of the light 1 and eye 117 receives at least a portion of the light 2. As will be discussed in more detail, eye 116 does not see light 2 and eye 117 does not see light 1, according to one example. Since there is a displayed image 140A for the participant 110's right eye and a displayed image 140B for the participant 110's left eye, the participant 110 perceives the "object" in at least 3 dimensions (3D), according to one example. Participant 120 can also perceive the "object" in at least 3D, for example, if participant 120's head gear 120A included the optional projector 126 that projected another displayed image.

With respect to a head gear 120A with one projector 122, the image 192C can be created based on the database 191 and with respect to the location of the participant 120. The projector 122 can receive and project the image 192C onto the display surface 110A resulting in displayed image 140C. Light 3 is associated with the projected image 192C. According to one example, the display surface 100A reflects and diffuses the light 3, so that the participant 120's eyes 124 and 125 see at least a portion of the light 3. Since there is a displayed image 140C for both of the participant 120's eyes, the participant 120 can perceive the "object" in at least 2 dimensions (2D). According to one example, a displayed image 140A-C is also referred to as "the displayed versions of the object."

Since, according to one example, the images 192A-192C are created with respect to locations associated with the participants 110, 120 relative to the display surface 100A, each of the participants 110, 120 perceive the displayed version 140 of the object from their own unique view points 182, 183. The unique view points 182, 183 are also referred to as "personal view points" since they are unique for each of the participants 110, 120. Unique view points 182, 183 may overlap but are unique because they are not identical, according to one example. Each participant 110, 120 has the illusion of viewing a displayed version 140 of the object from the correct viewpoint relative to where each participant 110, 120 is located with respect to the display surface 100A. According to one example, a participant's "location" includes their position horizontally or vertically and orientation, or a combination thereof, among other things, relative to the display surface. Further, each participant 110, 120 is provided the correct view point when they walk around the display surface 100A, according to one example. For example, if participant 110 moves from location a to location b, participant 110's view point changes from view point 182 to view point 181.

According to one example, images are not created for other potential view points for locations where none of the participants are located. For example, an image would not be created for location d where none of the participants 110, 120 are located, as depicted in FIG. 1A. Further, participant 110's images 192A and 192B do not include participant 120's image 192C. Similarly, participant 120's image 192C does not include participant 110's images 192A and 192B.

According to one example, the optional cameras 112, 115, and 121 can capture information that is integrated with information from the dataset 191 that represents the object to create the images 192A-C. For example, the images 192A-C can also represent how the participants 110, 120 are interacting with the displayed images 140. The projected images 1 and 2 for participant 110's view point 182 could depict where either participant 110 or participant 120 or both of the participants 110 and 120 are pointing at the displayed images 140. According to one example, a participant's hand, finger or pointing device is seamlessly integrated with the displayed version 140 of the object. For example, the displayed images 140A-C may include masks for a participant's 110, 120 finger or hand, or a pointing device so that the displayed images 140A-C do not overlay the participant's 110, 120 hand, finger or pointing device. According to another example, a pointing device may be used to annotate the displayed images 140 and the displayed images 140 may include the annotations. The annotations may be in a particular color. The annotations may be text or symbols, among other things. Another example of participant interaction is a participant using their hand or pointing device to move the displayed version 140 of the object, for example, by rotating the displayed version 140 in the direction that they wave their hand or moving the displayed version 140 in the direction that they move their hand.

According to one example, the displayed images 140 are updated to reflect how the participants 110, 120 are interacting with the displayed images 140, for example, by updating the displayed images 140 to reflect that a participant 110, 120 is pointing at a new location on the displayed version 140 with their hand or a pointing device or writing new text on the displayed version 140, that a participant 110, 120 has moved with respect the displayed version 140 and so on. According to one example, a tracking system is used as a part of updating the displayed version 140 to reflect how the participants 110, 120 are interacting with the displayed version 140. According to one example, the cameras 111, 115 and 123 provide information to the tracking system to determine the relationship of various entities with respect to each other.

According to one example, images 192A-C and images 140A-C are versions of the object. The images 192A-C are created versions of the object and images 140A-C are displayed versions of the object. Images can also be stored versions, transmitted versions, received versions, projected versions, displayed versions, reflected versions, or diffused versions of the object, or a combination thereof. An image, whether stored, created, transmitted, received, projected, displayed, reflected, or diffused, can be referred to as "an image from a participant's view point" or referred to as "an image with respect to a participant's view point," among other things.

According to one example, the term "perceive" is used to refer to what a participant's brain perceives and the word "see" is used to refer to what a participant's eyes see. For example, participant 110's eyes 116, 117 may respectively see slightly different images 140A, 140B. However, the participant 110's brain may perceive a three dimensional (3D) version of the object based on the slightly different images 140A, 140B that the participant 110's eyes 116, 117 see.

According to one example, "a scene" that a participant perceives includes the physical objects, such as the display surface, participants' hands, or pointers, that are co-located with the participant, among other things, in combination with participant's view point of virtual objects, such as displayed images from the participant's view point. The scene could also include images of physical objects that reside at remote locations. For example, the scene could include an image of a participant that is located remotely in another room, another part of the world, etc. Another example, an image of a part of the remotely located participant's hand, an image of an object that the remotely located participant is using to point at reflected version of the object that they perceive. At least some of the images may not be displayed by the display surface. For example, projectors can be oriented in a way that a participant perceives an image of a remotely located participant from the corner of their eye without the image of the remotely located participant being projected onto the display surface. In this case, "the scene" can include the image of the remotely located participant, which is not displayed by the display surface.

Figure 1B:
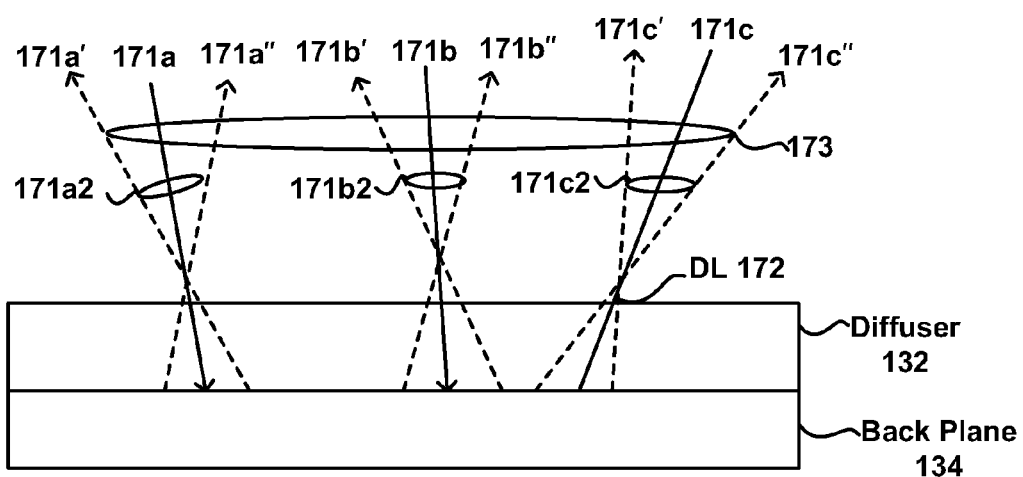
FIG. 1B depicts an example display surface.

FIG. 1B depicts a display surface 100, according to one example. The features depicted in FIG. 1B can be arranged differently than as illustrated, and can implement additional or fewer features than what are described herein. Further, the features in FIG. 1B can be combined in various ways. The system, depicted in FIG. 1B, can be implemented hardware, hardware and machine readable instructions, (such as but not limited to hardware and software or hardware and firmware), or a combination thereof. The display surface 100 may be a horizontal display surface 100A (also referred to as a "table top display surface"), as depicted in FIG. 1A, or may be a vertical display surface (also referred to as a "wall mounted display surface").

The display surface 100 includes a retro-reflective backplane 134 and a diffuser 132, according to one example. The retro-reflective back plane 134, according to one example, can be made of micro corner cube reflectors, among other things. The diffuser 132, according to one example, can be made of holographic diffusing material, among other things.

The light 171a-171c associated with an image projected by a projector is reflected back by the retro-reflective backplane 134 of the display surface 100A in the exact opposite direction that the light 171a-171c was received from the same projector, according to one example. For example, if projector 112 (FIG. 1A) projects the light 171a-171c, then the retro-reflective backplane 134 would reflect the light 171a-173c directly back to the source of the light, which in this example is projector 112.

According to one example, the diffuser 132 has optical properties that slightly diffuse the light 171a-171c, which is reflected back by the retro-reflective backplane 134. A diffuser 132, according to one example, is made of a holographic diffusing material that has optical properties that enable shaping the received light 171a, 171b, 171c to an isotropic shape or an anisotropic shape, as will be discussed in more detail, resulting in the reflected diffused light 171a', 171a'', 171b', 171b'', 171c', and 171c'' that form shaped volumes of light 171a2, 171b2, and 171c2. The volume of light 173 includes the individual volumes of light 171a2, 171b2, and 171c2. The volumes 171a2-171c2, 173 can be cone shaped or non-cone shaped depending on the optical properties of the diffuser 132. The cone of light 173 includes the individual cones 171a2, 171b2, 171c2 for each of the light rays 171a-171c, according to one example. The size of the cone 173, according to one example, is based on the volume occupied by the individual cones 171a2, 171b2, 171c2 for the rays of light 171a', 171a'', 171b', 171b'', 171c', 171c'' that were diffused and reflected back. The diffused reflected light is associated with a volume of diffused light 172, according to one example.

For the sake of simplicity, FIG. 1B depicts one cone of diffused light 173. However, typically, several cones of diffused light 173 are reflected back from a display surface 100 where there is one cone 173 for each projector. An intersection between two cones 173 of diffused light is referred to as "cross-talk." According to one example, the diffuser 132's optical properties provide for minimal to no cross talk between two cones 173 of diffused light from the left eye and right eye projectors 112, 114 (FIG. 1A), for example by providing 0.35 degrees of distance between a participant's eyes of 62.5 millimeters (mm) covering a range of up to 20 feet. According to one example, a diffuser's 132 optical properties enable a display surface 100 to support any number of projectors with minimal to no cross-talk.

The special optical properties of the diffuser 132 may cause diffused light 171a', 171a'', 171b', 171b'', 171c', and 171c'' to be diffused equally in all directions (also referred to as "isotropic") resulting in small circular shaped cones of diffused light 161, 162, 163 as depicted in FIG. 1A or the special optical properties of the diffuser 132 may cause diffused light 171a', 171a'', 171b', 171b'', 171c', and 171c'' to be diffused different amounts depending on direction (also referred to as "anisotropic") resulting in narrow tall shaped ellipses of diffused light to accommodate participants of different heights.

Respective projected light 1-3 (FIG. 1A) are examples of light 171a-171c (FIG. 1B) that are projected onto a display surface 100A and diffused volumes 161, 162, 163 (FIG. 1A) are examples of diffused volumes 172 (FIG. 1B). For example, referring to FIG. 1A, with respect to participant 110, projector 112 projectors the light 1 associated with the image 192A for view point 182 in the direction indicated by arrow 1 and projector 114 projects the light 2 associated with the image 192B for view point 182 in the direction indicated by arrow 2. With respect to participant 120, projector 122 projects the light 3 associated with the image 192c for view point 183 in the direction indicated by the arrow 3.

For isotropic diffusion in conjunction with a horizontal display surface 100, such as display surface 100A depicted in FIG. 1A, if a participant is z units away from the display surface 100, the cone with a diffusion of theta degrees, according to one example, has a radius of approximately z tan (theta). As long as a participant's eye is within the volume formed by the cone 173, the participant's eye sees the displayed version of the object from the correct view point, provided there is minimal cross talk (e.g., overlap) of displayed images between the participant's eyes, according to one example. As the participant moves further away from the display surface 100, z is increased and theta is decreased, according to one example, to ensure that the correct eye is seeing the appropriate displayed image. For anisotropic diffusion in conjunction with a vertical display surface 100, as will be discussed in more detail, the diffusion angle is increased vertically since the variations in participants' heights has less bearing in the horizontal display surface 100 example.

According to one example, a projector is in close enough proximity to a corresponding eye when the eye lies within the volume of reflected, diffused cone (also referred to as "cone volume") coming from that projector. The formula for determining a cone with a diffusion of theta degrees and radius of z, as discussed herein, can be used to determine how close to place the projector to the light corresponding to the cone volume. Alternatively, given a distance between an eye and a corresponding projector, the formula can be used to determine how much diffusion would result in the eye being within the cone volume. As discussed herein, for the two projectors per person example, too wide a diffusion angle may result in "cross talk" between the eyes. The diffusion for the two projectors per participant example may be less than half the distance between a participant's two eyes, which on average is 62.5 millimeters (mm). As discussed herein, for the single projector per participant example, the diffusion angle can be wider since both of the participant's eyes can fall within the cone volume.

Continuing the discussion of display surface 100 depicted in FIG. 1B in the context of display surface 100A depicted in FIG. 1A, the retro reflective backplane 134 (FIG. 1B) reflects the light 1-3 (FIG. 1A) back when the light 1-3 from the projectors 112, 114, 122 (FIG. 1A) hits the retro reflective backplane 134, as discussed herein. The diffuser 132 (FIG. 1B) has special optical properties that slightly diffuse the light as indicated by the circular shaped cones of diffused light 161, 162 163 (FIG. 1A) so that at least a portion of the light projected by the projectors 112, 114, 122 (FIG. 1A) can be reflected back to the participants' 110, 120 eyes 116, 117, 124, 125 (FIG. 1A). For example, the light 1-3 (FIG. 1A) is projected onto the display surface 100A (FIG. 1A) that includes a diffuser 132 (FIG. 1B) and retro-reflective backplane 134 (FIG. 1B), according to one example. The retro-reflective backplane 134 reflects the projected light 1-3 (FIG. 1A) hack in the same direction that the projected light 1-3 (FIG. 1A) hits the backplane 134 (FIG. 1B), according to one example. The diffuser 132 (FIG. 1B), according to one example, diffuses the reflected light resulting in reflected diffused light, such as rays 171a', 171a", 171h', 171h", 171c', and 171c" (FIG. 1B) within a volume formed by a cone, such as cone 173 (FIG. 1B), causing a portion of the light 1 (FIG. 1A) from projector 112 (FIG. 1A) to be redirected back to eye 116 (FIG. 1A), a portion the light 2 (FIG. 1A) from projector 114 (FIG. 1A) to be redirected back to eye 117 (FIG. 1A), and a portion of the light 3 (FIG. 1A) from projector 122 (FIG. 1A) to be redirected back to eyes 124 and 125 (FIG. 1A) so that a participant's eye sees the displayed version of the object from the correct view point.

Figure 2:
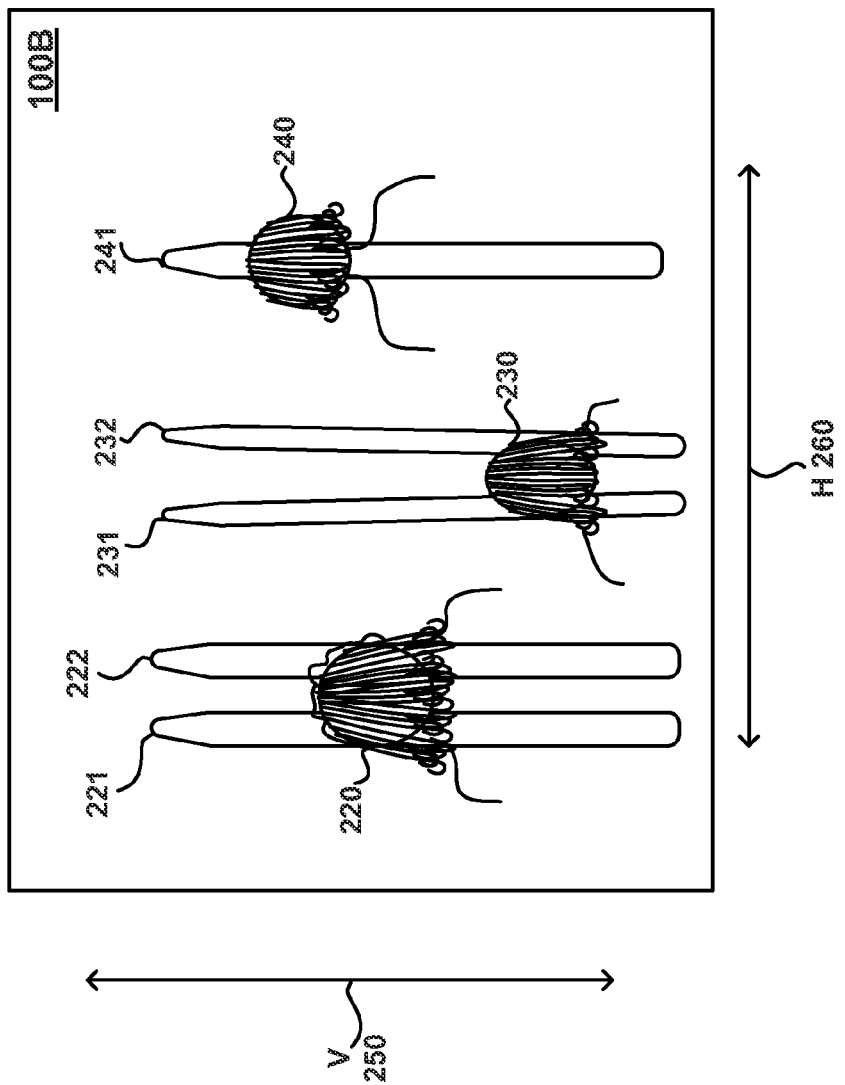
FIG. 2 depicts an example system for participant collaboration on a displayed version of an object example using a vertical display surface example.

FIG. 2 depicts a vertical display surface 100E (also referred to as a "wall mounted display surface"), according to one example. According to one example, the vertical display surface 100B's (FIG. 2) diffuser 132 (FIG. 1B) has optical properties that cause the light 171a, 171b, 171c (FIG. 1B) to diffuse different amounts depending on direction (also referred to as "anisotropic") resulting in narrow tall ellipses of diffused light 221, 222, 231, 232, 241 (FIG. 2) to accommodate participants 220, 230, 240 (FIG. 2) of different heights.

As depicted in FIG. 2, two volumes of diffused light 221, 222 are associated with participant 220, two volumes of diffused light 231, 232 are associated with participant 230, and one volume of diffused light 241 is associated with participant 240. Two volumes of diffused light 221, 222, 231, 232 (FIG. 2) per participant 220, 230 (FIG. 2) would result from a participant 220, 230 (FIG. 2) wearing head gear with two projectors, such as head gear 110A (FIG. 1A), according to one example. One volume of diffused light 241 (FIG. 2) would result from a participant 240 (FIG. 1A) wearing head gear with one projector, such as head gear 120A (FIG. 1A), according to one example. According to one example, the amount of diffusion is wider for the single projector example the diffuser's optical properties provide for a wide enough ellipse 241 so that both of participant 240's eyes see light associated with the ellipse 241. According to another example, instead of a wider ellipse 241, participant 240 stands far enough away from the display surface 100B so that both of participant 240's eyes see light associated with the ellipse 241.

Referring to FIG. 1A, an object may be any kind of object that participants 110, 120 of the collaboration may be interested in working on together. For example, the object may be a molecule, a design of a mechanical or electrical device, a building or an item of clothing, or a model of the universe, among other things. The object may be still or in motion. For example, a molecule may be still whereas an item of clothing may be depicted in motion as the person wearing the clothing moves. Although examples are described in the context of one object, examples are well suited to multiple objects as might be used, for example, in a multi-user game or part of a city with multiple buildings.

Referring to FIG. 1A, the data set 191 representing the object may be a 3D model, light field model, or raw data from multiple sensors, such as cameras, among other things. An example of a 3D model is a mathematical model that represents an object with a multitude of little triangles here each triangle has an associated color. An example of a light field model is a plurality of rays of light where each ray has an associated color and angular direction relative to a camera. An array of cameras can be used to create the data that represents the "rays" of a light field model. A data set 191 can represent the object by including data that represents the "rays" of a light field model.

Still referring to FIG. 1A, according to one example, a participant 120 can perceive a 2D image of the object from their view point 183 by projecting an image 140C that is intended for the participant 120's eyes 124, 125 from a single projector 122 associated with the participant 120's headgear 120A. According to another example, a participant 110 can perceive a 3D image of the object from their view point 182 by projecting slightly different images 140A, 140B that are intended for the participant 110's respective right and left eyes 116, 117 from two projectors 112, 114 associated with the participant 110's headgear 110A. For example, each of the two projectors 112, 114 can project a slightly different image 192A, 192B of the object. One of the projectors 114 projects an image 192B for the left eye and the other projector 112 can project an image 192A for the right eye causing the participant's 110 brain to perceive a 3D version of the object.

An image can include another dimension for time. Further, motion parallax can be used in conjunction with either the single projector 122 example or the two projector 112, 114 example to provide a participant 110, 120 with cues pertaining to the motion of an object. For example, an object may move over time, such as a horse running. Motion parallax can be used to provide a participant with cues pertaining to the horse running.

Still referring to FIG. 1A, according to one example, a tracking system is used for tracking each participants' 110, 120 instantaneous position (x, y, z) and orientation (wx, wy, wz) relative to some global coordinate system, such as a real world coordinate system. The real world coordinate system that is associated with the objects in the real world, such as the display surface 100A and the participants 110, 120, is used for determining where the real world objects are relative to the real world coordinate system, according to one example. Therefore, the tracking system can use the real world coordinate system to determine where the participants 110, 120 are relative to the display surface 100A. Examples of tracking systems include, among other things, a camera based tracking system and an ultrasound based tracking system.

According to one example, a tracking system, which is associated with a collaboration system, such as the system depicted in FIG. 1A, is calibrated, for example, using unique markings, fiducials or patterns on the display screen 100A, such as bar codes, projected active elements, a projected series of coded patterns, small colored LEDs, or some geometry of the display screen 100A, such as the display screen's 100A corners. According to one example, the tracking system uses a camera associated with the display surface 100A and markings, fiducials, geometry or LEDs associated with the head gears 110A, 120A.

A tracking system can be pre-calibrated or self-calibrated on the fly. Both the intrinsic parameters of a camera 111, 115, 121 and extrinsic parameters that are outside of a camera 111, 115, 121 can be calibrated. Examples of an intrinsic include lens distortion and non-idealities. An example of an extrinsic parameter is determining the real world coordinate system with respect to some predetermined origin.

Still referring to FIG. 1A, according to one example, a virtual world coordinate system is associated with each of the participants' 110, 120 view points 182, 183. A real world coordinate system that is associated with the objects in the real world, such as the display surface 100A and the participants 110, 120, is used for determining where the real world objects are relative to the real world coordinate system.

According to one example, there is a virtual coordinate system per participant 110, 120. For example, participant 110 sees displayed images 140A and 140B from the perspective of participant's 110 view point 182 along with any interactions of participants 110 and 120 with the images 140A-C and 140B from the perspective of participant's 110 view point 182 by determining the relationship of the real world coordinate system with the virtual world coordinate system for participant 110. Similarly, participant 120 sees a displayed image 140C from the perspective of participant's 120 view point 183 along with any interactions of participants 110 and 120 with the images 140A-C from the perspective of participant's 120 view point 183 by determining the relationship of the real world coordinate system with the virtual world coordinate system for participant 120.

Calibrating the tracking system, as described herein, enables an initial relationship between the real world coordinate system and each of the virtual world coordinate systems to be established. The relationship between the real world and the virtual world coordinate systems shall also be referred to herein as a "coordinate system relationships."

The tracking system can update the relationship between the real and virtual world coordinate systems as the tracking system determines that the location of any real or virtual object has moved or changed. The relationship between the two coordinate systems is used for providing updated displays of images 140 that reflect how the participants 110, 120 are interacting with the images 140 and moving in relationship to the images 140. For example, if participant 120 points at a first location on the images 140 at time t, new images 192A-C are created and displayed as images 140A-C for both of the view points 182, 183 to reflect that participant 120 is pointing at the first location on the images 140. If participant 120 then points at a second location on the images 140 at time t+1, new images 192A-192C are created and displayed as images 140A-C for both of the view points 182 and 183 to reflect that participant 120 is now pointing at the second location on the images 140. The relationship between the two coordinate systems enables determining where the participant 120, which is in the real world coordinate system, is touching the images 140 at the first and second locations with respect to the view points 182, 183, which have their own virtual world coordinate systems, in order to create the new images 192A-C.

Still referring to FIG. 1A, according to one example, augmented reality can be used to occlude part of the displayed images 140. For example, if a real world object, such as a part of a participants' 110, 120 hand or a pointer, is pointing at a part of the displayed images 140, augmented reality can be used to determine the part of the images 140 that the real world object would overlay. A mask can be determined to create the illusion that the real world object is overlaying the appropriate part of the displayed images 140. In another example, augmented reality can be used to create the illusion that annotation in the form of text, symbols, color, or a combination thereof, is on top of the displayed images 140. A new image 192A-C is created and displayed that includes the mask or the annotation, or a combination thereof. By creating and displaying a new image 192A-C that includes the mask or the annotation, or a combination thereof, the real world object that corresponds to the mask or the annotation can be seamlessly integrated in the displayed images 140. According to one example, the tracking system is used as a part of determining the appropriate position of an occlusion or annotation relative to the displayed images 140.

According to one example, a collaboration system, such as the system depicted in FIG. 1A, uses state information that includes the relationship between real and virtual world coordinate systems. The state information may also include information representing participant 110, 120 interactions with the displayed images 140, pertaining to pointing, annotations, occlusions, moving the object, as discussed herein.

Although various examples were described with respective participants that are using the same physical display surface (also referred to as co-located participants), examples are well suited for remote participants that use different physical display surfaces. For example, referring to FIG. 1A, there may be two display surfaces 100 where one is in, e.g., San Jose, Calif. and another is in, e.g., Berlin, Germany. Participant 110 may be looking at the display surface 100A in San Jose, Calif. and participant 120 may be looking at the other display surface 100 in Berlin, Germany. The information captured by the cameras 111, 115, 121 can be communicated between the respective participants' 110, 120 head gears 110A, 120A, the information used by the projectors 112, 114, 122 can also be communicated between the respective participants' 110, 120 head gears 110A, 120A so that both participants 110, 120 see the images 140 and the interactions of the respective participants 110, 120 with the images 140. Participant 110 in San Jose, Calif. can see the images 140 from their view point 182 as well as any interactions that participant 120 in Berlin, Germany performs on the images 140 from participant's 110 view point 182. Similarly, participant 120 in Berlin, Germany can see the images 140 from their view point 183 as well as any interactions that participant 110 in San Jose, Calif. performs on the images 140 from participant's 120 view point 183.

According to one example, additional cameras and projectors can be used to create the illusion that the respective participants see each other from the side. For example, additional cameras and projectors besides cameras 111, 115, 121 and projectors 112, 114, 122 can be used to cause a first participant 110 to have the illusion of second participant 120 standing next to the first participant 110 when the participants 110, 120 are remotely located.

Still referring to FIG. 1A, according to one example, one or more computing devices 113, 123, 190 create an image 192A-C for a view point 182, 183 using the data set 191 that representing the object. According to another example, the one or more computing devices 113, 123, 190 create an image 192A-C for a view point 182, 183 using the data set 191 and images captured from participants' 110, 120 cameras 111, 115, 121. The images captured by the participants' 110, 120 cameras 111, 115, 121 can be used as a part of creating an image 192A-C, according to one example, that depicts the participants' 110, 120 interactions, such as their fingers, all or part of their hands, and pointing devices, among other things as described herein. According to one example, image creation uses information from the tracking system, for example, to determine the position of a finger, part of a hand, a pointing device, annotations, whether an object has been moved by a participant's 110, 120 hand or a pointing device, or a combination thereof, among other things. According to one example, one or more computing devices 113, 123, 190 update the images 192A-C, for example, for each view point 182, 183 based on the tracking system information and the images captured from the participants' 110, 120 cameras 111, 115, 121 that may also include participant 110, 120 interactions, as described herein. The updated images 192A-C can be communicated to the appropriate projector 112, 114, 122, then projected and displayed as images 140A-C, as described herein.

According to one example, there is a network 195 of computing devices 113, 123, 190. The network 195 can be a peer to peer architecture of computing devices 113, 123 or a centralized server 190 or a hybrid architecture that includes both peers 113, 123 and a centralized server 190. All or part of the data, which is used according to various examples, can reside on one or more of the computing devices 113, 123, 190. For example, the dataset 191 may reside on a centralized server 190. The state information may reside on computing devices 113, 123 associated with the head gears. The centralized server 190 and the head gear computing devices 113, 123 can communicate the data to each other 113, 123, 190. In another example, the state information and the data set 191 reside on a centralized server 190. In yet another example, the appropriate state information can reside at each of the head gear computing devices 113, 123 and the data set 191 can reside at one of the head gear computing devices 113, 123. In yet another example, all or part of the data set 191 may reside on all of the head gear computing devices 113, 123. The computing devices 113, 123, 190 can communicate using wireless or wired communications.

Although FIG. 1A depicts computing devices 113, 123 attached to the head gear, the computing devices 113, 123 may be associated with the participants 110, 120 by some other means, such as a hand held, a belt or a clip.

Still referring to FIG. 1A, according to one example, there is one controller per participant 110, 120 that determines the coordinate system relationships, creates an image 192A-C for a participant's 110, 120 viewpoint, tracks state information for that participant 110, 120, communicates information with various hardware, software, or firmware entities, or other machine readable instructions, or a combination thereof, among other things. A controller may be hardware, software, firmware, or other machine readable instructions, or a combination thereof. A controller may be implemented as a computing device 113, 123, 190 or may be implemented as an instance of an application that executes on a computing device 113, 123, 190, among other things.

In a peer to peer architecture where there is one computing device 113, 123 per participant 110, 120, the controllers can reside at the computing devices 113, 123 associated with each participant 110, 120. In centralized server architecture, the controllers can reside at a computing device 190 that serves as the centralized server. In a combination model, the controllers may reside at the computing devices 113, 123 associated with the participants 110, 120 and the centralized server 190 may perform some type of coordination between the controllers. In yet another example, one of the controllers associated with a participant 110, 120 may be a master and the other controllers may be slaves.

Figure 3:
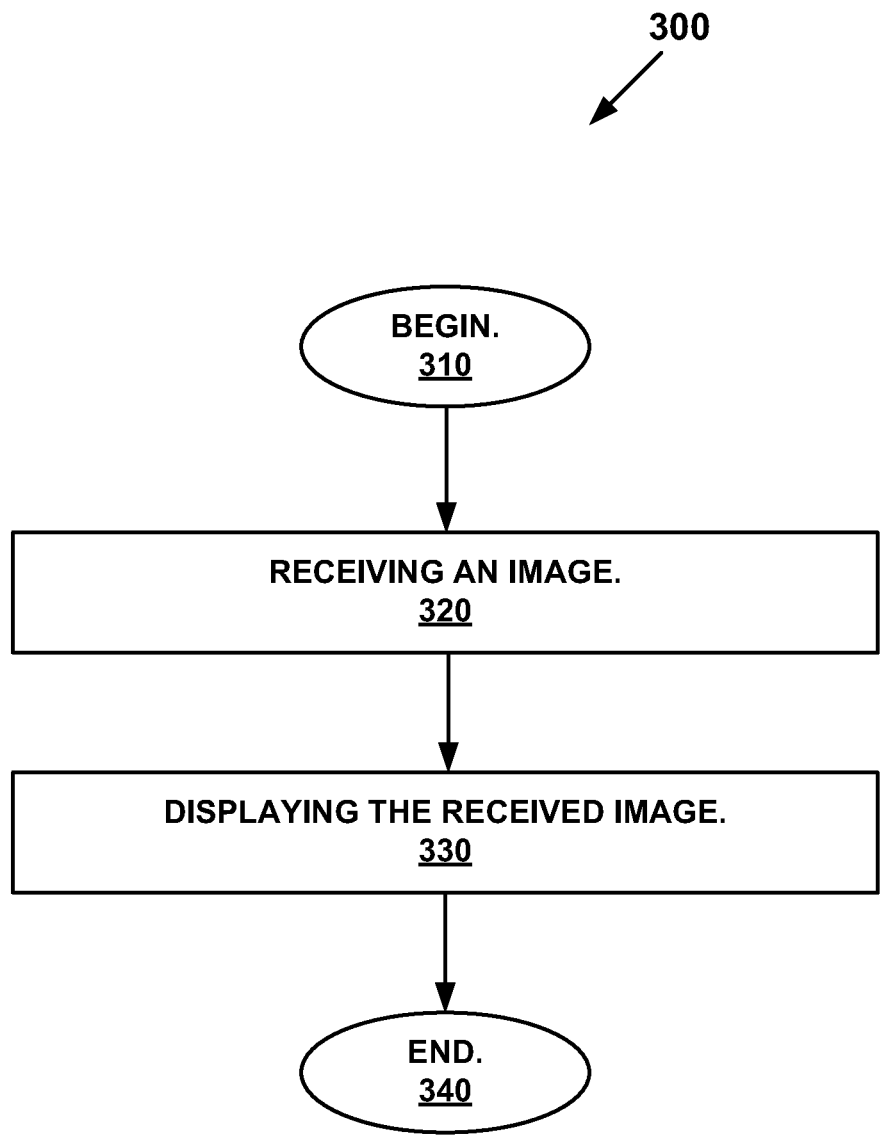
FIG. 3 depicts an example flowchart of a method for participant collaboration on a displayed version of an object example.

FIG. 3 depicts a flowchart 300 of a method for participant collaboration on a displayed version of an object, according to one example. Although specific operations are disclosed in flowchart 300, such operations are exemplary. That is, examples are well suited to performing various other operations or variations of the operations recited in flowchart 300. It is appreciated that the operations in flowchart 300 may be performed in an order different than presented, and that not all of the operations in flowchart 300 may be performed.

The following is an illustration of flowchart 300 for a head gear that includes one projector. The illustration of flowchart 300 (FIG. 3) shall refer to FIG. 1A.

At 310, the method begins.

At 320, an image 192C is received by a projector 122 that is associated with a first participant 120's head gear 120A. The head gear 120A does not obstruct either of the first participant 120's eyes 124, 125. The image 192C was created with respect to the first participant 120's view point 183 based on a dataset 191 that represents an object, such as a molecule. The creation of the image 192C with respect to the first participant 120's view point 183 does not require creation of other images for other potential view points at locations, such as location d, where none of the participants 110, 120 are located and the creation of the image 192C does not require the creation of the other images 192A, 192B for the other potential view points that include a second participant 110's view point 110.

At 330, the received image 192C is displayed on a display surface 100A by projecting the received image 192C onto the display surface 100A, the first participant 120 perceiving the displayed image 1400 by reflecting and diffusing at least a portion of the light 3 associated with the displayed image 1400 from the display surface 100A, as discussed herein, to the first participant 120's eyes 124, 125 that is closest to the projector 122. More specifically, the portion of light for the one projector example is reflected back to both of the first participant 120's eyes 124, 125 but are not reflected back to the eyes 116, 117 of another participant 110, as discussed herein.

At 340, the method stops.

The following is another illustration of flowchart 300 for a head gear that includes two projectors. The illustration of flowchart 300 (FIG. 3) shah refer to FIG. 1A.

At 310, the method begins.

At 320, image 192A and 192B are received respectively by projectors 112 and 114 that are associated with a first participant 110's head gear 110A. The head gear 110A does not obstruct either of the first participant 110's eyes 116, 117. The images 192A, 192B were created with respect to the first participant 110's view point 182 based on a dataset 191 that represents an object, such as a molecule. The creation of the images 192A, 192B with respect to the first participant 110's view point 182 does not require creation of other images for other potential view points at locations, such as location d, where none of the participants 110, 120 are located and the creation of the images 192A, 192B does not require the creation of the other images 192C for the other potential view points that include a second participant 120's view point 183.

At 330, the received images 192A, 192B are displayed on a display surface 100A by projecting the received images 192A, 192B onto the display surface 100A. The first participant 110 perceives the displayed images 140A, 140B by reflecting and diffusing at least a portion of the light 1, 2 associated with the displayed image 140A, 140B from the display surface 100A, as discussed herein to the first participant 110's eyes 116, 117 that is closest to the projector 112, 114. More specifically, a portion of the light 1 is reflected back to the first participant 110's right eye 116, which is nearest to projector 112 that received image 192A, as discussed herein. Similarly, a portion of the light 2 is reflected back to the first participant 110's left eye 117, which is nearest to projector 114 that received image 192B, as discussed herein. According to one example, none of the light 1 or 2 is reflected back to any other participant's eyes, such as participant 120's eyes 124, 125. Further, according to various examples as described herein, there is a minimal amount of cross talk between the reflected diffused portions of light received by the eyes 116, 117. More specifically, the reflected diffused portion of light 1 is intended for the right eye 116 and the reflected diffused portion of light 2 is intended for the left eye. Therefore, participant 110's right eye 116 receives a minimal amount of the reflected diffused portion of light 2, which is intended for the left eye 117, and participant 110's left eye 117 receives a minimal amount of the reflected diffused portion of light 1, which is intended for the right eye 116.

At 340, the method stops.

According to one example, head gear 120A includes a means for receiving an image 192A-C that is created with respect to a first participant 120's view point 183 based on a data set 191. According to one example, the created images 192A-C may be received by a computing device 123, may be received by a projector 122, or some other apparatus, software process, firmware, or other machine readable instructions, associated with the head gear. According to one example, a projector 122 is an example of a means for projecting the received images 192A-C onto a display surface 100A. According to one example, the projector 122 in combination with the display surface 100A is an example of a means for reflecting a portion of the light 3 associated with the projected images 140A-C back to the first participant's 120 eye 124, 125, which is closest to the projector 122. According to one example, a display surface 100A is an example of a means for reflecting. The display surface 100A is further configured with a means for minimizing cross talk between eyes, as described herein.

According to one example, a camera 111, 115, 121 is a means for capturing an image from the view point 183 of the first participant 120. According to one example, a computing device 113, 123, 190 or an instance of an application is an example of a means for updating the projected images 140A-C based on information from a tracking system. According to one example, a computing device 113, 123, 190 or an instance of an application is an example of a means for determining relationships between a real world coordinate system and virtual coordinate systems associated with participants' 110, 120 view points 182, 183, wherein there is a one to one correlation between virtual coordinate systems and each view point 182, 183 of a plurality of participants 110, 120 of the collaboration. According to another example, a tracking system is an example of a means for determining relationships. According to another example, a tracking system is used by a means for determining relationships.

Any one or more of the examples described herein can be implemented using computer readable storage medium and computer-executable instructions which reside, for example, in computer-readable storage medium of a computer system or like device. The computer readable storage medium can be any kind of memory that instructions can be stored on. Examples of the computer readable storage medium include but are not limited to a disk, a compact disk (CD), a digital versatile device (DVD), read only memory (ROM), flash, and so on. As described above, certain processes and operations of various examples are realized, in one example, as a series of instructions (e.g., software program or other machine readable instructions) that reside within computer readable storage memory of a computer system and are executed by the processor of the computer system. When executed, the instructions cause the computer system to implement the functionality of various examples.

Although many of the examples are described in the context of a table top display surface 100A (FIG. 1A), examples are also well suited for a wall mounted display 100B (FIG. 2). Although many of the examples are described in the context of the images 140 being a 3D molecule, examples are well suited for other applications, such as multi-user games, designing a mechanical or electrical device, designing or modifying a building or an item of clothing, or a model of the universe, among other things.

Using one projector 112, 114 (FIG. 1A) per eye 116, 117, according to one example, provides for auto stereoscopic viewing. Various examples provide for viewing 3D images 140 without requiring shutter or polarized glasses. According to one example, the use of head gear 110A, 120A that does not obstruct a participant 110, 120's eyes 116, 117, 124, 125 enables participants 110, 120 to see each other in contrast to head mounted displays (HMDs), which cover the participants' 110, 120 eyes 116, 117, 124, 125 and prevent the participants 110, 120 from seeing each other. According to one example, the cost and complexity of a system as depicted in FIG. 1A or 2 scales linearly because the number of view points 182, 183, 221, 222, 231, 232, 241 is related linearly to the number of participants 110, 120, according to one example, due to there being one head gear 110A, 120A per person. According to one example, the retro reflective material of a display surface 100 provides for a high resolution display in contrast to using lenticles (also referred to as lens lets), such as those found in conventional multi-view displays where, for example, every 5$^{th}$ lenticles is dedicated to a different view for a conventional 5 view display. According to one example, by associating at least one projector 112, 114, 122 per person in combination with the retro reflective display surface 100 enables each person 110, 120 to have their own unique personalized view point 182, 183. According to one example, associating at least two projectors 112, 114 with a participant 110 enables the participant 110 to perceive an object in 3D. According to one example, images 140 that can be walked around are provided by a horizontal display surface 100A (also referred to as "table top") that the participants 110, 120 can walk around. According to one example, the display surface enables the use of low lumen projectors 112, 114, 122 because the display surface 100 redirects light back in almost the same direction as it is received instead of sending light in a multitude of directions. According to one example, the use of head gear 110A, 120A with at least one projector per person provides for projecting images 140 for the view points 182, 183 that are associated with the participants 110, 120 instead of projecting images for viewpoints where no participant is located. Further, the use of head gear 110A with at least one projector 112, 114 per participant provides for projecting images 192A, 192B for a first participant 110's view point 192 from the first participant 110's head gear 110A without projecting images 192C for other participants 120's view points 183.

Examples of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations. However, any two or more embodiments may be combined. Further, any embodiment may be used separately from any other embodiment. Features, structures, or characteristics of any embodiment may be combined in any suitable manner with one or more other features, structures, or characteristics.

What is claimed is:

1. An apparatus that enables participants to collaborate on a displayed version of an object, the apparatus comprising:
   a head gear for a first participant of the collaboration, wherein the head gear comprises a projector and the head gear does not obstruct the first participant's eyes;
   the projector to receive an image that was created with respect to the first participant's view point based on a dataset that represents the object, the creation of the image with respect to the first participant's view point does not require creation of other images for other potential view points that include a second participant's view point and include a potential view point at a location where none of the participants are located; and
   the projector to project the received image as a projected image onto a display surface including a reflective backplane and a diffuser, the projecting of the projected image onto the display surface to cause reflection of the projected image from the reflective backplane to form a reflected image that passes through the diffuser to provide diffused light to the first participant's eye that is closest to the projector, wherein motion parallax is to provide the first participant with motion cues.

2. The apparatus of claim 1, wherein the head gear further comprises:
   a camera to capture an image from the view point of the first participant;
   the projector to project the projected image that is created with respect to the first participant's view point and created based on the image captured by the camera with respect to the first participant's view point and based on an image captured with respect to a second view point of a second participant of the collaboration by a camera attached to a head gear of the second participant.

3. The apparatus of claim 1,
   wherein the projector is a first projector that is closer in proximity to a first eye of the first participant and that enables the first eye of the first participant to receive a first portion of the diffused light from the display surface; and
   wherein the head gear further comprises a second projector that is closer in proximity to a second eye of the first participant and that enables the second eye of the first participant to receive a second portion of the diffused light from the display surface.

4. The apparatus of claim 1, wherein the apparatus includes a tracking system to update an image of the object to reflect a change in the first participant's view point due to the first participant physically moving and the first participant's interactions with the projected image displayed by the display surface.

5. A method for participants to collaborate on a displayed version of an object, the method comprising:
   receiving, by a projector associated with a first participant's head gear that does not obstruct the first participant's eyes, an image that was created with respect to the first participant's view point based on a dataset that represents the object, wherein the creation of the image with respect to the first participant's view point does not require creation of other images for other potential view points at locations where none of the participants are located, and the creation of the image does not require the creation of other images for other potential view points that include a second participant's view point;
   projecting, by the projector, the received image as a projected image onto a display surface including a reflective backplane and a diffuser; and
   causing, due to the projecting of the projected image onto the display surface, reflection of a reflected image from the reflective backplane, the reflected image passing through the diffuser to provide diffused light to the first participant's eye that is closest to the projector, wherein motion parallax is to provide the first participant with motion cues.

6. The method of claim 5, further comprising:
   updating the received image based on information from a tracking system that monitors a physical movement of the first participant.

7. The method of claim 6, wherein the updating of the received image comprises:
   updating the received image to reflect a change in the first participant's view point due to the physical movement of the first participant.

8. The method of claim 6, wherein the updating of the received image comprises:
   updating the received image to reflect the first participant's interactions with an image displayed at the display surface.

9. A system comprising:
   a head gear for a first participant and comprising a projector, wherein the head gear does not obstruct the first participant's eyes, the projector to receive an image that was created with respect to the first participant's view point based on a dataset that represents an object, wherein the creation of the image with respect to the first participant's view point does not require creation of other images for other potential view points at locations where none of participants of a collaboration are located, and the creation of the image does not require the creation of the other images for other potential view points that include a second participant's view point; and a display surface comprising a retro-reflective backplane and a diffuser, the projector to project the received image as a projected image onto the display surface, the projecting of the projected image onto the display surface to cause reflection of a reflected image from the retro-reflective backplane, the reflected image passing through the diffuser to provide diffused light to the first participant's eye that is closest to the projector, wherein motion parallax is to provide the first participant with motion cues.

10. The system of claim 9, further comprising:

a tracking system to monitor physical movement of the first participant and interaction of the first participant with a displayed image at the display surface, and the projector to receive an updated image of the object responsive to an output of the tracking system.

11. The system of claim 10, wherein the interaction of the first participant with the displayed image is selected from the group consisting of pointing at the displayed image, annotating the displayed image, and moving the displayed image.

12. The system of claim 10, wherein the tracking system is to update relationships between a real world coordinate system and virtual coordinate systems associated with view points of participants of the collaboration.

13. The system of claim 9, wherein the diffusing of the reflected image by the diffuser reduces cross talk between light perceived by the eyes of the first participant.

14. The apparatus of claim 3, wherein the received image received by the first projector is a first version of an image of the object, and the second projector is to receive a second, different version of the image of the object and to project the second, different version of the image of the object onto the display surface.

15. The apparatus of claim 1, wherein the reflective backplane of the display surface is a retro-reflective backplane.

16. The method of claim 5, wherein the projector is a first projector of the head gear closer to a first of the eyes of the first participant, the head gear further comprising a second projector closer to a second of the eyes of the first participant, wherein the received image received by the first projector is a first version of an image of the object, and the second projector is to receive a second, different version of the image of the object and to project the second, different version of the image of the object onto the display surface.

17. The method of claim 5, wherein the reflective backplane of the display surface is a retro-reflective backplane.

18. The system of claim 9, wherein the projector is a first projector of the head gear closer to a first of the eyes of the first participant, the head gear further comprising a second projector closer to a second of the eyes of the first participant, wherein the received image received by the first projector is a first version of an image of the object, and the second projector is to receive a second, different version of the image of the object and to project the second, different version of the image of the object onto the display surface.

* * * * *